Aug. 7, 1945.   V. E. ENZ   2,381,270
BEARING ASSEMBLY
Filed Dec. 7, 1943
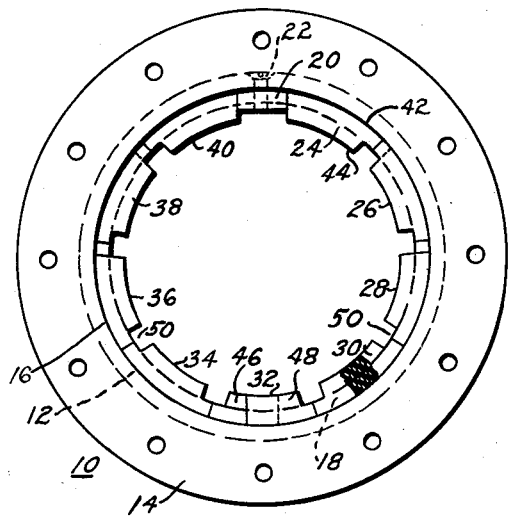
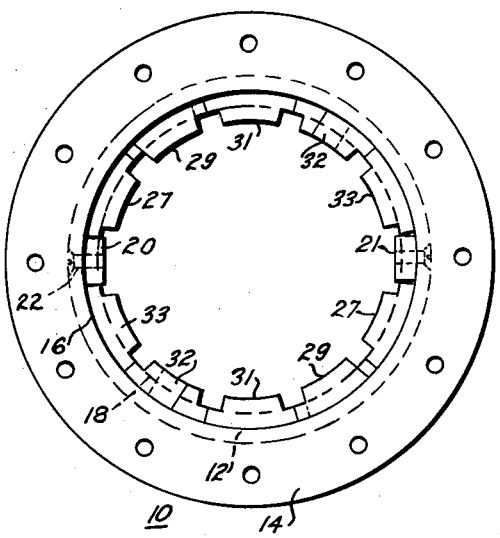
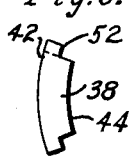
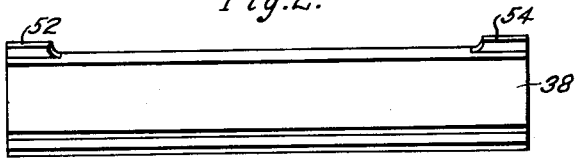
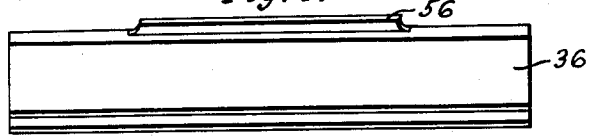
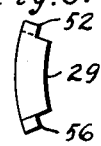
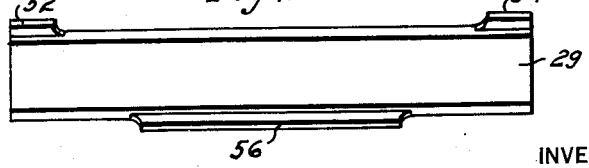
INVENTOR
Vern E. Enz.
BY
James K. Ely
ATTORNEY Patented Aug. 7, 1945

2,381,270

UNITED STATES PATENT OFFICE

2,381,270
BEARING ASSEMBLY

Vern E. Enz, Turtle Creek, Pa., assignor to Westinghouse Electric Corporation, East Pittsburgh, Pa., a corporation of Pennsylvania Application December 7, 1943, Serial No. 513,259

7 Claims. (Cl. 308—238)

This invention relates generally to bearings and, more particularly, to composition bearing assemblies.

Heretofore, composition bearing assemblies have been employed extensively in the marine industry. However, trouble has been encountered in such service for the composition bearings swell and become distorted when immersed in water, oil, gasoline, or other liquids.

Since the bearing assembly is usually formed of staves retained in a housing the swelling of the composition staves usually forces the staves to buckle inwardly, forces as high as 19,500 pounds per square inch having been measured between the staves. Under such conditions, the staves buckle inwardly to seize the shaft.

An object of this invention is to compensate for the expansion and swelling of a bearing of molded composition under predetermined operating conditions.

Another object of this invention is to provide a bearing assembly having staves of molded composition so formed as to compensate for swelling when immersed in liquids.

Other objects of this invention will become apparent from the following description, taken in conjunction with the accompanying drawing, in which:

Figure 1 is a view in elevation and partly in section of a bearing assembly embodying the teachings of this invention;

Fig. 2 is a top plan view of one of the staves utilized in the bearing assembly of Fig. 1;

Fig. 3 is an end view of the stave of Fig. 2;

Fig. 4 is a top plan view of another of the staves utilized in the bearing assembly of Fig. 1;

Fig. 5 is an end view of the stave shown in Fig. 4;

Fig. 6 is a view in elevation of another bearing assembly embodying the teachings of this invention;

Fig. 7 is a top plan view of one of the staves of the bearing assembly shown in Fig. 6; and Fig. 8 is an end view of the stave shown in Fig. 7.

Referring to Fig. 1 of the drawing, this invention is illustrated by reference to a bearing assembly 10. As illustrated, a housing or bushing 12 of bronze or any other suitable material is utilized for supporting the bearing material, the housing having a flange 14 at one end thereof to assist in maintaining the bearing material in position in the bore 16 of the housing and a flange 18 at the other end to facilitate the mounting of the assembly.

In the embodiment illustrated, the bore 16 of the housing is machined smooth and a keeper strip 20 is seated thereon. The keeper strip 20 may be of any suitable strong material being secured in position by means of screws 22 which project through the housing or bushing into the keeper strip. The keeper strip 20 preferably extends from one end of the bushing to the other and may be either a single long strip or a plurality of short strips (not shown) laid longitudinally endwise in aligned relation.

In order to provide a suitable bearing surface for a shaft (not shown), a group of staves is positioned to seat on the smooth bore 16 in a tight fit with the keeper strip 20. The staves and keeper strip are preferably formed of laminated fibrous material such as paper, duck, or other cloth fabrics or fiber glass cloth impregnated with a resinous binder such as a phenolic, urea, vinyl or other resin or resinous mixture consolidated under heat and pressure into a strong body. Such materials are well known in the art and need not be further described herein, it being apparent that the choice of the fibrous material and the resinous binder utilized therewith depends upon the characteristics which it is required to develop in the bearing material. After having been consolidated, the formed laminated body is machined to the predetermined and required shape of the stave, the staves being so machined however that the laminations of the fibrous material extends substantially perpendicular to the base of the stave to present edges at the bearing surface, as shown in Fig. 1.

In Fig. 1, each of the formed staves 24, 26, 28, 30, 32, 34, 36, 38 and 40 of laminated material is machined to have a base portion 42, the curvature of the base portion being the same as the curvature of the smooth bore 16. Each of the staves is also machined to have a curved bearing surface 44 for receiving the shaft (not shown), the machining of the bearing surfaces usually being accomplished after the staves are assembled in operative position in the housing. As illustrated, stave 32 is formed of two complementary tapered sections 46 and 48, this stave functioning in the well-known manner to wedge the other staves in operative position with respect to the keeper strip 20.

The staves are preferably cut away along their edges adjacent the bearing surface whereby adjacent bases of the staves cooperate to form grooves 50 when the staves are assembled in operative position. The grooves 50 function as lubricating grooves, being of a depth sufficient to provide proper lubrication for the bearing surface.

Since the staves are maintained in operative position in an extremely tight fit, being wedged against the keeper strip 20 by the stave 32, and since the material of the staves swells when immersed in water or other lubricating liquids, the staves 26, 28, 36 and 38 of the embodiment shown in Fig. 1 are specially constructed to compensate for swelling.

Referring to Figs. 2 and 3, there is shown the design of the stave 38, stave 26 being of similar construction but reversed in the assembly shown in Fig. 1. As illustrated, one edge of the base portion 42 of stave 38 is so cut away intermediate its ends as to provide projections 52 and 54 adjacent the ends of the stave for engaging the base of the adjacent stave 40 in the assembly of Fig. 1.

An edge of the stave 36 is also cut away as illustrated in Figs. 4 and 5 to provide a projection 56 on the base portion thereof intermediate of the ends of the stave to seat against the straight edge of the base portion of the adjacent stave 38. Stave 28 of the assembly shown in Fig. 1 is similar to the stave 36 illustrated in Fig. 4 having a projection intermediate of the ends of the stave along one edge of the base for seating against the adjacent stave 26.

With the staves assembled, it is found that when the bushing is immersed that the staves 26 and 28 and staves 36 and 38 cooperate in the assembly to permit distortion of the staves to compensate for the swelling without an accompanying detrimental distortion of the internal bearing surface. With the projections of the staves in offset relation as shown, it is found in practice that all of the staves in the assembly swell and move somewhat around the inside of the bushing 12, the staves 26—28 and 36—38 having sufficient elasticity to compensate for such movement. Under such conditions it is found that the stave 38 swells whereby its cut away edge tends to fill the cut away section of the base defined by the slot between the projections 52 and 54. Similarly, the ends of the stave 36 swell and tend to fill the spaces formed by cutting away the ends of the stave, the swelling being to such a predetermined degree that, in practice, the swollen ends seat against the adjacent stave. The staves 26 and 28 cooperate in a similar manner, the two groups of specially constructed staves permitting swelling of the stave assembly without seizure of the shaft (not shown).

In the embodiment illustrated in Fig. 6, the bearing assembly utilizes two keeper strips 20 and 21 for maintaining the staves in assembled relation. The use of two such keeper strips makes it possible to repair one-half of the bearing assembly without affecting the other half of the bearing assembly. In the embodiment shown, a group of staves 27, 29, 31, 32 and 33 is illustrated as being retained on each side of and between the keeper strips 20 and 21. These staves are similar to the staves shown in the embodiment of Fig. 1, being formed of the laminated fibrous material impregnated with a resinous binder and machined to require shape and size for seating on the smooth bore of the housing. As in the embodiment of Fig. 1, the bearing assembly of Fig. 6 also utilizes a two piece stave 32 in each of the groups of staves for wedging the staves of each of the groups tightly against the keeper strips 20 and 21.

The stave 29 of each of the group of staves retained between the keeper strips 20 and 21 is of special construction embodying the features of construction of the staves 36 and 38 of the embodiment of Fig. 1. In this embodiment, however, the features utilized in forming the staves 36 and 38 of the embodiment shown in Fig. 1 are employed in the construction of the single stave 29. As illustrated more clearly in Figs. 7 and 8, one of the edges of the base portion of the stave 29 is so machined as to provide a single projection 56 thereon intermediate the ends of the stave, the other edge of the base portion of the stave being so cut away intermediate of the ends as to form the projections 52 and 54 adjacent the ends of the stave.

With the staves 29 formed in this manner and assembled in operative relation with respect to the other staves of the groups between the keeper strips 20 and 21, it is found that an adequate compensation is made for swelling of the staves when the bearing is immersed. Under operating conditions, where water is employed as the lubricant it is found that the stave 29 is so distorted that, in effect, the material of the base portion fills the cut-away portions of the base of the stave 29. This swelling and distortion of the stave 29 is sufficient to relieve the pressure between the staves of the group, thereby overcoming the tendency of the other staves to buckle inwardly and seize the shaft (not shown).

In forming the staves utilized in the embodiments of Figs. 1 and 6, it has been found that a definite relation between the size of the projections must be maintained in order to obtain the best sidewise distortion of the stave for compensating for the swelling of the composite staves. For example, it has been found that the projections 52 and 54 along one edge of the base of the stave must constitute from 14% to 20% of the length of the stave whereas the projection 56 intermediate of the ends of the stave must constitute from 45% to 55% of the length of the stave. In actual practice, excellent results are obtained where each of the projections 52 and 54 constitute about 8.33% of the length of the stave, giving an over all projecting contact surface of 16.66% of the length of the stave along the one side, the projection 56 provided on another edge of a base portion of one of the staves constituting about 50% of the length of the stave. As specific examples of the size of the projections on certain length staves which have been utilized, reference may be had to the following table:

| Staves | Length in inches of— | |
|---|---|---|
| | Projections 52 and 54 | Projection 56 |
| 12 | 1 | 6 |
| 24 | 2 | 12 |
| 36 | 3 | 18 |

In the embodiments illustrated in both Figs. 1 and 6, the special staves afford adequate compensation for peripheral expansion of the fibrous material of the assembled staves to give a substantially uniform swelling pattern without an accompanying buckling of the staves. By maintaining the substantially uniform swelling pattern a continuous film of lubricating medium can be maintained over the internal bearing surface to give longer life to the bearing and the shaft operated therein.

Different modifications and arrangements of the keeper strips and the specially constructed staves are possible and, in fact, are necessitated by the size of the bearing assembly and are, therefore, clearly contemplated within the scope of the invention. For example, where the periphery of the bearing assembly is quite large, it will be necessary to employ more of the specially constructed staves in order to provide adequate compensation for the swelling of the bearing material. Likewise, the number of staves of each group and the shape and size of the lubricating grooves may be varied somewhat depending upon the size of the bearing required.

While this invention has been described with reference to particular embodiments thereof, it is, of course, not to be limited thereto except insofar as is necessitated by the scope of the appended claims.

I claim as my invention:

1. In a bearing, in combination, a housing, a keeper strip carried by the housing, a plurality of staves for lining the housing, projections provided on certain of the staves, the projections on one stave engaging the next adjacent stave, the projections on the staves being offset relative to one another to permit a distortion of the staves to compensate for swelling.

2. In a bearing, in combination, a housing, a keeper strip carried by the housing, a plurality of staves for lining the housing, each of the staves comprising a strong body consolidated from laminated fibrous material impregnated with heat-hardening resinoid, projections provided on certain of the staves, the projections on one stave engaging the next adjacent stave, the projections on the staves being offset relative to one another to permit a distortion of the staves to compensate for swelling.

3. In a bearing, in combination, a housing, a keeper strip carried by the housing, a plurality of staves for lining the housing, each of the staves comprising a strong body consolidated from laminated fibrous material impregnated with heat-hardening resinoid, projections provided on opposite sides of one of the staves, the projections on the one stave engaging the adjacent staves, the projections on one side of the one stave being offset relative to a projection on the other side to permit a distortion of the one stave to compensate for swelling.

4. In a bearing, in combination, a housing, a keeper strip carried by the housing, a plurality of staves for lining the housing, each of the staves comprising a strong body consolidated from laminated fibrous material impregnated with heat-hardening resinoid, projections provided on opposite sides of one of the staves, the projections on the one stave engaging the adjacent staves, the projections on one side of the one stave being disposed adjacent the ends of the stave, the other side of the one stave having a projection intermediate of the ends of the one stave in offset relation to the projections on said one side to permit a distortion of the one stave to compensate for swelling.

5. In a bearing, in combination, a housing, a keeper strip carried by the housing, a plurality of staves for lining the housing, each of the staves comprising a strong body consolidated from laminated fibrous material impregnated with heat-hardening resinold, projections provided on opposite sides of one of the staves, the projections on the one stave engaging the adjacent staves, the projections on one side of the one stave being disposed adjacent the ends of the stave, and constituting from 14% to 20% of the length of the stave, the other side of the one stave having a projection intermediate of the ends of the one stave and constituting from 45% to 55% of the length of the stave, the projections on the opposite sides of the stave being offset relative to one another to permit a distortion of the stave to compensate for swelling.

6. In a bearing, in combination, a housing, a keeper strip carried by the housing, a plurality of staves for lining the housing, each of the staves having bearing surfaces and base portions disposed with their bases seating against the housing on opposite sides of the keeper strip, the bases of certain of the staves being wider than the bearing surfaces to provide water grooves between said certain of the staves, each of the staves comprising a strong body consolidated from laminated fibrous material impregnated with heat hardening resinold, the bases of certain of the staves being cut away in a predetermined manner to provide an edge of one of the staves with projections of the base adjacent only the ends of the one stave and a corresponding edge of an adjacent stave with a projection intermediate the ends of the stave, the projections of the adjacent staves cooperating to permit a distortion of the staves to compensate for swelling.

7. In a bearing, in combination, a housing, a keeper strip carried by the housing, a plurality of staves for lining the housing, each of the staves having bearing surfaces and base portions disposed with their bases seating against the housing on opposite sides of the keeper strip, the bases of certain of the staves being wider than the bearing surfaces to provide water grooves between said certain of the staves, each of the staves comprising a strong body consolidated from laminated fibrous material impregnated with heat hardening resinold, the bases of certain of the staves being cut away in a predetermined manner to provide an edge of one of the staves with projections of the base constituting from 14% to 20% of the length of the stave adjacent only the ends of the one stave and a corresponding edge of an adjacent stave with a projection intermediate the ends of the stave, the intermediate projection constituting from 45% to 55% of the length of the adjacent stave, the projections of the adjacent staves thereby being in offset relation relative to one another for cooperating to permit a distortion of the adjacent staves to compensate for swelling.

VERN E. ENZ.